March 11, 1958   M. S. GORDON   2,826,060
AUTOMATIC OIL TESTING APPARATUS
Filed Aug. 22, 1956   2 Sheets-Sheet 1
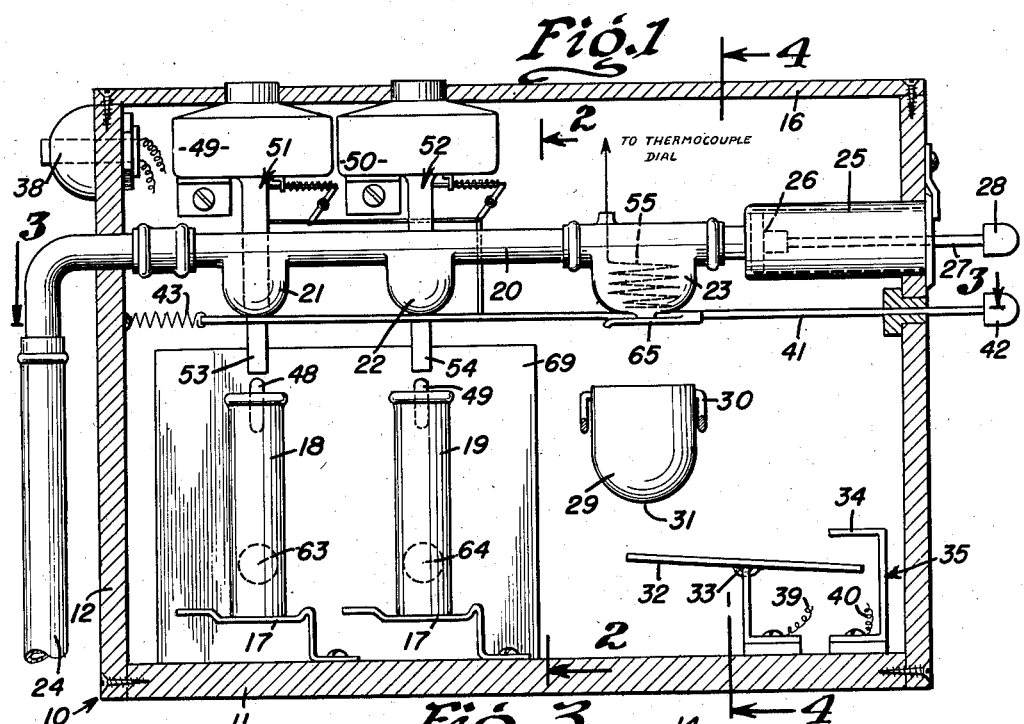
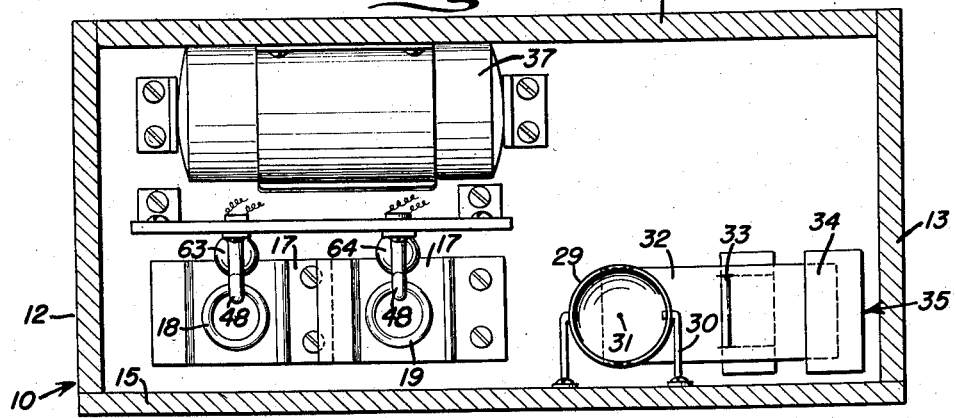
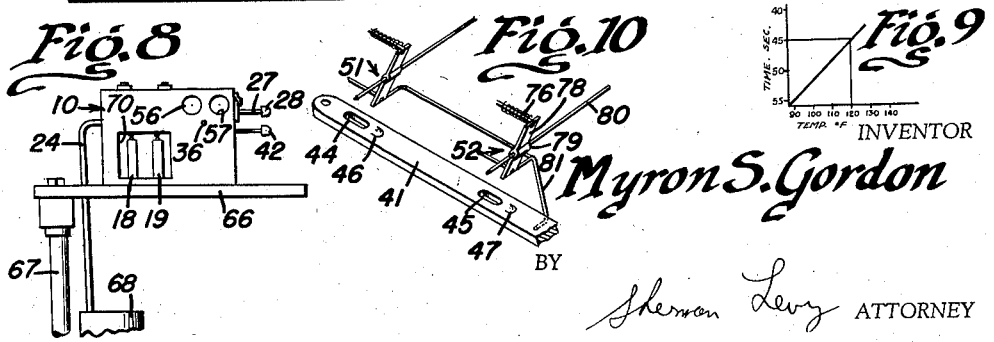
INVENTOR
Myron S. Gordon
BY
Sherman Levy   ATTORNEY March 11, 1958     M. S. GORDON     2,826,060
AUTOMATIC OIL TESTING APPARATUS
Filed Aug. 22, 1956     2 Sheets-Sheet 2
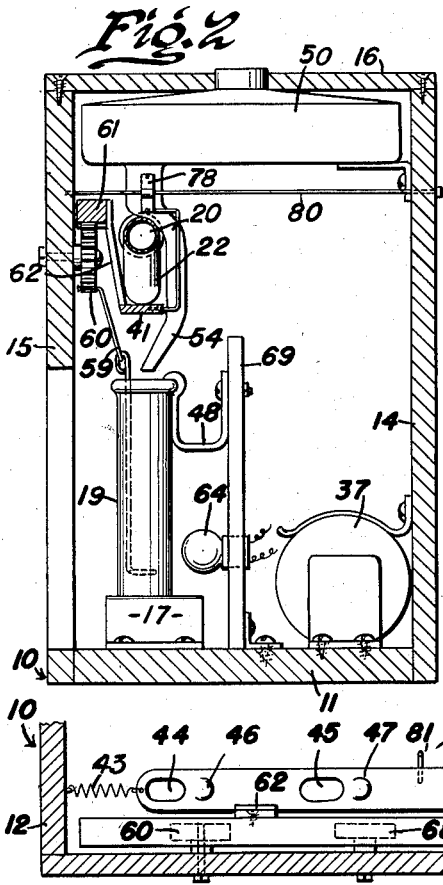
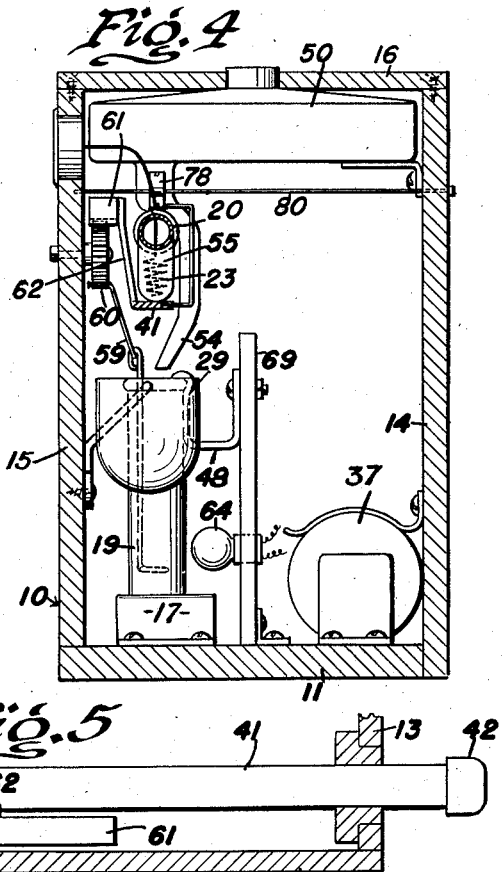
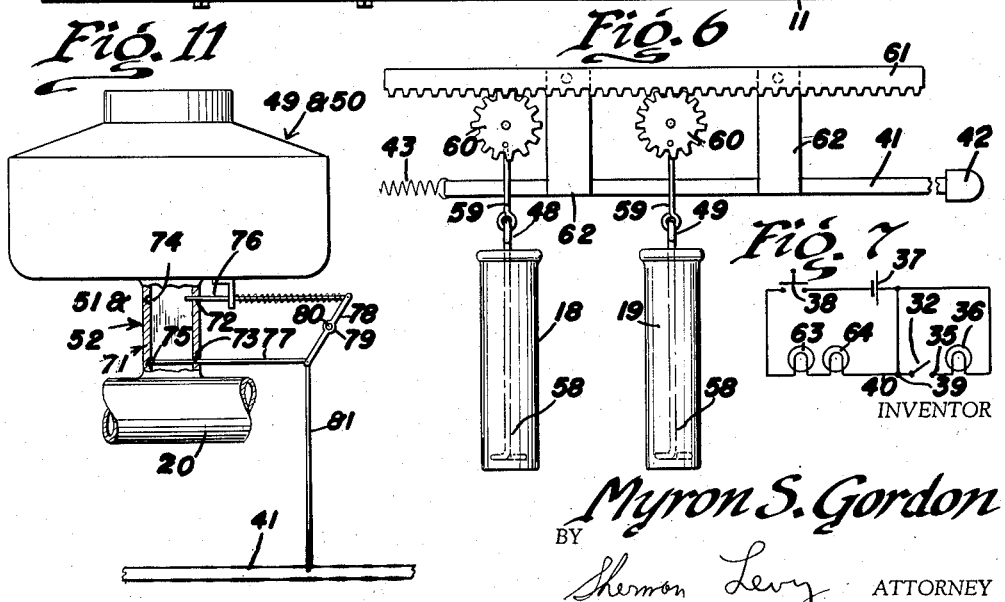
INVENTOR
Myron S. Gordon
BY Sherman Levy ATTORNEY United States Patent Office 2,826,060
Patented Mar. 11, 1958

2,826,060
AUTOMATIC OIL TESTING APPARATUS
Myron S. Gordon, Annapolis, Md.
Application August 22, 1956, Serial No. 605,623
2 Claims. (Cl. 73—56)

This invention relates to the testing of oil, and more particularly to an apparatus for testing oil such as oil used in engines or the like.

The object of the invention is to provide an apparatus for testing oil which will permit the user to readily test oil to determine the various characteristics thereof.

Another object of the invention is to provide an oil testing kit or apparatus which can be operated by non-skilled or non-technical personnel.

A still further object of the invention is to provide an oil testing set-up for testing lubricating oils so that various characteristics of the oil can be readily determined such as the amount of harmful contaminants, as well as the amount of solids in the oil, corrosive acids, as well as fuel dilution so that a determination can be made as to whether the oil is usable or not.

A still further object of the invention is to provide an oil testing apparatus which is easy to use and wherein the characteristics of the oil are automatically determined, the apparatus adapted to be used on hot or cold oil and wherein the test can be performed quickly and easily, the set-up being portable, unbreakable, and wherein no outside source of electricity is required, the set-up permitting extremely quick and accurate determinations to be made and wherein the parts are easy to clean.

A further object of the invention is to provide an automatic oil testing apparatus which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal vertical sectional view taken through the oil test apparatus of the present invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a sectional view illustrating a control rod.

Figure 6 is a fragmentary elevational view illustrating the agitator mechanism.

Figure 7 is a view illustrating schematically the wiring diagram.

Figure 8 is a fragmentary elevational view showing the apparatus supported on a suitable stand.

Figure 9 is a view illustrating a chart for use with the present invention.

Figure 10 is a fragmentary perspective view, with parts broken away and in section, illustrating a portion of the valve arrangement.

Figure 11 is a fragmentary sectional view illustrating a portion of the valve assembly.

Referring in detail to the drawings, the numeral 10 designates a hollow housing or box which includes a horizontally disposed bottom wall 11, and spaced parallel vertically disposed end walls 12 and 13. The housing 10 further includes spaced parallel side walls 14 and 15, Figure 2, and a horizontally disposed top wall 16.

Extending upwardly from the bottom wall 11 of the housing 10 and secured thereto, is a pair of support members 17 which are adapted to support a first and second vial 18 and 19. Also supported by the housing 10 is a tube or conduit 20 which has chambers or compartments adapted to be connected to an engine such as the engine 21, 22, and 23 depending therefrom. A conduit 24 is connected to an end of the tube 20, and the conduit 24 is adapted to be connected to an engine such as the engine of a vehicle whereby some of the engine oil can be sucked up into the tube 20 to be tested. A casing 25 may be connected to an end of the tube 20, and a plunger 26 is reciprocably arranged in the casing 25, there being a rod 27 connected to the plunger 26, the rod 27 being provided with a manually operable knob 28 on its outer end, Figure 1.

Arranged below the chamber 23 is a cup 29 which is provided with a central aperture or opening 31 in the bottom thereof, and the cup 29 is adapted to be used in measuring the viscosity of the oil. Support members 30 may be provided for supporting the cup 29. The oil which flows out through the opening 31 in the bottom of the cup 29 is adapted to strike or engage a pivotally mounted contact 32 which is pivotally supported by a fulcrum 33, and the contact 32 is mounted for movement into and out of electrical engagement with a portion 34 of a fixed contact 35. A light bulb 36 is electrically connected to the contacts 32 and 35 by means of wires 39 and 40, and the numeral 37 designates a suitable source of supply of electrical energy such as a battery. The battery 37 is adapted to be positioned within the housing 10 so that it is not necessary to have an outside source of electrical energy to operate the apparatus. The numeral 38 designates a manually operable push button switch which is for a purpose to be later described.

Slidably or reciprocably arranged in the housing 10 is a bar or rod 41 which has a manually operable knob 42 on its outer end, Figure 5. A coil spring 43 has one end connected to the bar 41, and the bar 41 is provided with a pair of spaced apart slots or openings 44 and 45 which are mounted for movement into and out of registry with openings in the bottoms of the chambers 21 and 22. The bar 41 may further be provided with raised portions 46 and 47 which serve as valves so as to close off the bottoms of the chambers 21 and 22 when the bar 41 is in the proper position.

Clamps 48 may be provided for helping to steady or support the vials 18 and 19, Figure 2.

Supported in the upper portion of the housing 10 is a pair of containers 49 and 50 which are adapted to hold fluids. Valves 51 and 52 are provided for controlling the flow of fluid through the bottoms of the containers 49 and 50, and spouts 53 and 54 lead from the lower ends of the containers 59 and 50 to the vicinity of the upper ends of the vials 18 and 19. A suitable temperature responsive element 55 is arranged in the chamber 23, and the temperature responsive element 55 may be a thermocouple or the like, and the temperature responsive element 55 is adapted to be connected to a suitable thermometer 56 which may be mounted on the exterior of the housing 10. Also mounted in the exterior of the housing is a timer 57 which may be of conventional construction for a purpose to be later described.

There is further provided a means for agitating the contents of the vials 18 and 19 so as to insure a more accurate reading, and this agitator means comprises agitators 58 which are positioned in the vials 18, and 19. Links 59 connect the agitators 58 to gear wheels 60 which mesh with a rack 61, and lugs 62 may connect the rack 61 to the bar 41. Thus, as the bar 41 is manually moved, the agitators 58 will move so as to stir up the contents of the vials 18 and 19. A light bulb 63 is arranged behind the vial 18, and a similar light bulb 64 is positioned behind the other vial 19. A valve 65 is carried by the bar 41 for controlling the flow of oil through an opening in the bottom of the chamber 23 so that the oil flowing from the chamber 23 to the viscosity cup 29 can be controlled as desired.

Referring to Figure 8 of the drawings, there is shown a set-up whereby the housing 10 can be supported on a platform 66 which may be secured to an upright post 67, and in Figure 8 the numeral 68 designates a flush tank which can be used for receiving excess fluid from the test apparatus.

A vertically disposed partition 69 may be arranged in the housing for supporting the light bulbs 63 and 64. A portion of the wall 15 may be cut away as at 70 whereby the user can readily view the vials or containers 18 and 19.

From the foregoing, it is apparent that there has been provided an oil tester which can be used for testing oil for various properties or characteristics. In use, the knob 28 is initially grasped and pulled out to thereby actuate the plunger 26 so that oil will be sucked up through the conduit 24 from the engine of the vehicle such as the engine of a vehicle in a gasoline service station. This oil will then flow up into the tube 20 and then the knob 28 is pressed inwardly. Next, the temperature on the thermometer 56 is noted, and the thermometer 56 is actuated by means of the thermocouple 55 which is arranged in engagement with the oil in the chamber 23. Then, from the chart shown in Figure 9, the time of flow is noted. Then, the timer 57 is set at the designated time and the rod or bar 41 is pulled out by means of the knob 42. This permits oil to flow downwardly through the openings in the bottom of the chambers 21, 22 and 23. Then, the bar 41 is moved inwardly back to its original position. Then, if the light bulb 36 is on or off when the bell timer 57 rings, this information is noted. Then, the push button 38 is pushed inwardly and the user observes whether the bulb 63 is visible behind the vial 18 and also the user observes the color of the lower layer of fluid in the vial 19. The oil tester is automatic and all tests are run simultaneously without the necessity of the operator touching the various parts by hand.

Thus, it will be seen that there has been provided a means for testing oil such as lubricating oil wherein the apparatus is portable and wherein the device can be operated by non-skilled personnel. With the present invention lubricating oil can be tested so as to ascertain if the oil is satisfactory for continued use since the oil is tested for its amount of harmful contaminants, such as solids, corrosive acids and fuel dilution. Furthermore, the device is simple to use and the apparatus operates automatically and the apparatus can be used for testing either hot or cold oil in a very short period of time. The device is portable, unbreakable, it requires no outside source of electricity, and the determinations can be made quickly and accurately and the device is easy to clean.

Previously, in order to determine the condition of a used oil, a sample of the oil was taken from the engine and submitted to a chemical laboratory for analysis. This oil was then subjected to various physical and chemical tests which are conducted by trained personnel which took between four to eight hours. The results of these tests were sent back to the operator of the engine who had to evaluate the results and decide for himself the condition of the used oil, and if it was satisfactory for further use. The total time from taking the oil sample, to receiving and evaluating the results usually took between three and five days resulting in possible engine failures which could have been avoided if the condition of the oil was obtained or determined rapidly.

The present invention is especially suitable for use in gasoline filling stations where rapid tests can be made of the condition of the used oils from automobiles waiting to be filled with fuel. Thus, during the time that the fuel is being delivered to the automobile, the gasoline station attendant can set the oil tester in position, operate the device and determine the condition of the oil in the engine. The device also can be used on engine installations in automobiles, trucks, locomotives, ships, buses, power plants and the like and it can also be used by fleet operators in garages.

The operation of the apparatus is as follows: the clean vials 18 and 19 are clamped in place on the support member 17 and then the filler tube 24 is inserted into the crankcase of the engine through the dip stick holder. The handle or knob 28 on the plunger 26 is pulled out so as to draw oil up into the tube 20 and thereby fill the cups or chambers 21, 22 and 23. The knob 28 is then pushed back in to thereby force the surplus oil out of the tube 24. The temperature of the oil is noted on the thermometer 56 and the time of flow of the oil (seconds) at that temperature is determined from a flow time temperature chart such as the chart shown in Figure 9 which is provided with the apparatus. The timer 57 is set to the specified time which is determined from the chart, and the handle 42 is immediately pulled out, and pulling out of the handle causes the various functions simultaneously. First, it opens slide valves to release predetermined quantities of oil from the cups 21, 22 and 23 and also opens valves from the jars or containers 49 and 50 so as to release a predetermined quantity of fluid into the vials 18 and 19. Oil from the cup 21 and fluid from the jar 49 flows into the vial 18. Oil from the cup 22 and fluid from the jar 50 flows into vial 19. Oil from the cup 23 flows into the calibrated cup 29 and onto the pivoted contact arm 32 which closes the electrical circuit to the contact 35 and turns on the light bulb 36. Furthermore, this movement of the bar 41 results in rotation of the gear wheels 60 since the gear wheels 60 mesh with the teeth on the rack 61, and the rotation of the gear wheels 60 causes the agitators 58 to move so that the fluid in the vials is properly agitated. Then, the knob 42 is pushed inwardly to cause the agitators 58 to again move and this also operates the valves at the bottom of the jars 49 and 50 so as to permit a predetermined quantity of fluid to flow into the valve chambers at the bottom of the jars 49 and 50 for the next test.

Next, the electrical contact button 38 is pushed which lights up the bulbs 63 and 64 behind the vials 18 and 19. If the light 36 is on or off when the timer 57 reaches zero, this information is noted and the timer may include a bell which rings. The vials 18 and 19 are of the disposable type so that they can be discarded after they have been used. The tube 24 can be placed in engagement with cleaning fluid so that by manipulating the knob 28, the system can be readily flushed so that the device can be made ready for the next test.

The amount of solid contaminants in the used oil is determined by permitting a predetermined amount of oil and a clear diluent to flow into a vial. The mixture is agitated until it becomes homogeneous. A focused light bulb, which is placed directly behind the vial, is illuminated by the dry cell battery 37 which is arranged in the housing. If the light is visible, the amount of solid contaminants is not excess and the oil is considered satisfactory for further use. On the other hand, if the light cannot be seen, the amount of solid contaminants is excessive and the oil and/or oil filter is not satisfactory for further use.

The exact amounts of used oil and diluent used in the test are determined by blending various proportions of a dirty oil and diluent together so that the blend just barely allows the light to be visible through the vial. The oil used in this determination is a border line oil in regards to the quantity of solid contaminants it contains.

The amounts of used oil and diluent used in this evaluation are standardized in the oil tester.

The presence of corrosive acids in the used oil is determined by permitting a predetermined amount of the oil and the indicator solution to flow into a vial. The mixture is agitated until the two fluids are thoroughly mixed. The mixture is permitted to stand until the oil layer has separated from the indicator solution layer. The particular indicator used in this test turns a yellow color when the oil reaches a pH of approximately 4.2. The color of the lower layer (indicator layer) indicates the acidity of the lubricant. A focused light bulb is placed directly behind the vial and is illuminated by the dry cell battery so that the color of the lower level can be easily seen.

The presence of a fuel dilution in the used oil is determined by permitting a predetermined amount of oil to flow through an orifice 31 in the cup 29 onto the pivoted contact arm 32. The weight of the oil on the pivoted arm 32 causes the electrical circuit to be closed to thereby automatically turn on the light 36. The flow rate of an undiluted oil through the orifice 31 in the cup 29 is determined from a flow time temperature graph such as the graph shown in Figure 9. The timer 57 is set to the number of seconds that an undiluted oil of the same temperature as indicated by the thermometer should flow through the orifice. While the oil is flowing, the pivoted arm 32 is lowered to thereby close the electrical circuit. When the oil stops flowing, the arm 32 is released and the circuit is broken to thereby extinguish the light 36. When the bell on the timer 57 rings, if the light 36 is still on, the oil is not execssively diluted but if the light is out when the bell rings, the oil is excessively diluted.

Considering the chart shown in Figure 9, for example if the temperature of the oil is 120 degrees F., if it is undiluted, it should flow out of the cup in 45 seconds. The timer 57 is set for 45 seconds and the oil is permitted to flow out of the cup. When the 45 seconds are up, the timer bell will ring and if the light is on the oil is all right. The fluid in container 49 is a clear medium boiling point hydrocarbon which can be used as a diluent for used lubricating oil. The fluid in container 50 is a pH indicator which changes color at a pH of approximately 4.2.

Thus, it will be seen that in the present invention there has been provided a means for testing oil wherein a person first withdraws a sample of oil from the source of supply. Then, the temperature of the oil and the time of flow of oil is ascertained at this temperature and the time of flow of oil is measured or ascertained through its passage through an orifice. A chart is used with this measurement. Furthermore, a timer is set at this time and the predetermined amount of oil is permitted to flow through the orifice. If the oil passes through the orifice under the allocated time, the oil is considered diluted. Another portion of the oil is mixed with a predetermined amount of a hydrocarbon diluent in such a manner as to increase the translucency of the mixture. A source of illumination behind the mixture cannot be seen if the carbonaceous content of the oil reaches a certain degree.

Another portion of the used oil is mixed with a predetermined amount of pH indicator, agitated and then permitted to settle. The lower indicator level turns a certain color indicating the presence of corrosive acids.

All of the above tests are conducted simultaneously and automatically, the only action taken by the operator of the equipment being necessary is to insert the tube in the crankcase of the engine, and then pull out a sample of oil, set the timer, pull and push a lever and note the results of the test.

Referring to Figure 11 of the drawings, the construction of the valves 51 and 52 is shown in detail. Thus, there is provided tubes 71 which are provided for slots 72 and 73, and arranged in opposed relation with respect to the slots 72 and 73 are grooves or cutouts 74 and 75, there being plates or valve members 76 and 77 mounted for sliding movement in the slots 72 and 73. The plates 76 and 77 are connected to a bracket 78 which includes a shoulder or bushing 79 that is pivotally mounted on a rod 80, and arms 81 connect the valves to the bar 41, as shown in Figure 10. The bushing 79 is pivotally mounted on the rod 80 and the arm 81 is actuated by the bar 41 so as to simultaneously pull out the slide valve 77 and at the same time push in the slide valve 76. Thus, the material from the containers 49 and 50 is blocked from entering the vials 18 and 19 by the slide valve 76. The volume of fluid between the slide valves 76 and 77 is the predetermined amount of material which is added to the vial.

I claim:

1. In an oil testing apparatus, means for determining dilution in a sample of fluid, said means comprising a container provided with an aperture in the lower portion thereof, means for introducing a predetermined quantity of fluid into said container, movable means actuated by the flow of fluid through the aperture, and means operatably connected to said movable means for indicating the flow of fluid and stoppage of flow of fluid through the aperture.

2. In an oil testing apparatus, a hollow housing, a tube arranged in said housing, a plurality of chambers depending from said tube, means for connecting one end of said tube to a source of oil to be tested, manually operable means connected to the other end of said tube for drawing a sample of oil into the tube from the source of oil, disposable containers positioned below certain of said chambers, means for dispensing predetermined quantities of material into said containers, valve means for controlling the flow of material into said containers, and a calibrated apertured cup arranged below one of said chambers for receiving material from said last named chamber for use in determining the flow rate of the oil.

References Cited in the file of this patent
UNITED STATES PATENTS 2,091,222    Thomas _____ Aug. 24, 1937

OTHER REFERENCES

Methods of Analysis of Fuels and Oils, 1951, J. R. Campbell, pages 112, 113.